US008643967B2

(12) United States Patent
Katada et al.

(10) Patent No.: US 8,643,967 B2
(45) Date of Patent: Feb. 4, 2014

(54) MAGNETIC DISK DRIVE AND MICROWAVE ASSISTED RECORDING METHOD

(75) Inventors: Hiroyuki Katada, Odawara (JP); Yasutaka Nishida, Fujisawa (JP); Masato Shiimoto, Odawara (JP)

(73) Assignee: Hitachi, Ltd., Tokyo (JP)

(*) Notice: Subject to any disclaimer, the term of this patent is extended or adjusted under 35 U.S.C. 154(b) by 56 days.

(21) Appl. No.: 13/402,957

(22) Filed: Feb. 23, 2012

(65) Prior Publication Data

US 2013/0050865 A1 Feb. 28, 2013

(30) Foreign Application Priority Data

Aug. 29, 2011 (JP) ................................. 2011-186450

(51) Int. Cl.
*G11B 27/36* (2006.01)
*G11B 5/09* (2006.01)

(52) U.S. Cl.
USPC .................................. 360/31; 360/53; 360/59

(58) Field of Classification Search
USPC ............. 360/46, 53, 59, 31, 32, 55, 324, 110, 360/39; 324/212, 244, 250
See application file for complete search history.

(56) References Cited

U.S. PATENT DOCUMENTS

| 8,259,409 B2* | 9/2012 | Braganca et al. ............ 360/110 |
| 8,358,127 B2* | 1/2013 | Sato et al. .................... 324/250 |
| 2011/0292544 A1* | 12/2011 | Amemiya ..................... 360/110 |

FOREIGN PATENT DOCUMENTS

| JP | 6-243527 | 9/1994 |
| JP | 2011-248996 | 12/2011 |

OTHER PUBLICATIONS

Xiaochun Zhu et al., Bias-Field-Free Microwave Oscillator Driven by Perpendicularly Polarized Spin Current, IEEE Transactions on Magnetics, Oct. 2006, pp. 2670-2672, vol. 42, No. 10.
Jian-Gang Zhu et al., Microwave Assisted Magnetic Recording, IEEE Transactions on Magnetics, Jan. 2008, pp. 125-131, vol. 44, No. 1.
Yiming Wang et al., Media damping constant and performance characteristics in microwave assisted magnetic recording with circular ac field, Journal of Applied Physics, 105, 07B902, 2009.

* cited by examiner

*Primary Examiner* — Nabil Hindi
(74) *Attorney, Agent, or Firm* — Antonelli, Terry, Stout & Kraus, LLP.

(57) ABSTRACT

The present invention enhances reliability by correcting a write error due to unstable oscillation of a spin torque oscillator. In the present invention, a resistance value of a spin torque oscillator is monitored to detect that oscillation becomes unstable during recording. When a measured resistance value is out of a predefined normal range, information for which the recording operation is already performed is rewritten.

14 Claims, 10 Drawing Sheets

MAGNETIC DISK DRIVE AND MICROWAVE ASSISTED RECORDING METHOD

CLAIM OF PRIORITY

The present application claims priority from Japanese patent application JP2011-186450 filed on Aug. 29, 2011, the content of which is hereby incorporated by reference into this application.

BACKGROUND OF THE INVENTION

1. Field of the Invention

The present invention relates to a microwave-assisted magnetic recording method and a magnetic recording and reproducing apparatus which use a high frequency field in combination with a writemagnetic field from a write head.

2. Description of the Related Art

Miniaturization of bit size of recording media advances along with an increase in recording density of HDDs (Hard disk drives). However, with the bit size miniaturization advancing, loss of a recording state due to thermal fluctuation is of concern. While use of recording media with high magnetic coercivity (in other words, with high magnetic anisotropy) is needed to solve such a problem and maintain recording bits in stable condition in the high-density recording in the future, performing recording on a recording medium with high magnetic coercivity requires a strong writemagnetic field. However, in practice, due to downsizing of a write head and limitations on usable magnetic materials, there is also an upper limit on the strength of a writemagnetic field. For these reasons, the magnetic coercivity of recording media is restricted by the strength of a writemagnetic field that can be generated by a write head. Thus, in order to meet conflicting demands for media achieving high thermal stability while having magnetic coercivity which allows recording easily, recording methods have been devised to effectively reduce magnetic coercivity of a recording medium only during recording by using various aids. A typical method is thermally-assisted magnetic recording that is recording by using a magnetic head and a laser and the like in combination.

Meanwhile, there is also a method of performing recording by using a high frequency magnetic field in combination with a writemagnetic field from a write head and thereby locally reducing the magnetic coercivity of a recording medium. For example, Patent Document 1 discloses a technology for recording information by locally reducing the magnetic coercivity of a magnetic recording medium with the medium heated by Joule heating or magnetic resonance heating with the high frequency field. Such a recording method using the magnetic resonance of a high frequency field and the magnetic field from a magnetic head is hereinafter referred to as microwave-assisted magnetic recording. Using the magnetic resonance, the microwave-assisted magnetic recording requires application of a strong high frequency field, which is proportional to a magnetic anisotropy field of a medium, to produce the effect of reducing a switching field.

In recent years, the principle of generation of high frequency fields using spin torques like a spin-torque oscillator have been proposed, and the microwave-assisted magnetic recording has come to have a realistic possibility. For example, Non-Patent Document 1 discloses calculation results of a spin-torque oscillator which oscillates without any bias magnetic field from the external. In addition, Non-Patent Document 2 discloses a technology for recording information on a magnetic recording medium with high magnetic anisotropy by a perpendicular magnetic head and a field generation layer (FGL). The FGL is provided in the vicinity of the magnetic recording medium adjacent to a main pole of the perpendicular magnetic head and is configured to generate a magnetic field with fast magnetization rotation by spin torque. The FGL generates microwaves (high frequency field) during recording. Furthermore, Non-Patent Document 3 presents a spin-torque oscillator which controls a rotating direction of an FGL by utilizing a magnetic field of a main pole adjacent to the FGL. It is believed that these techniques can effectively leads to practical use of microwave assisted magnetization switching of media.

[Patent Document 1] JP 6-243527 A

[Non-Patent Document 1] X. Zhu and J. G. Zhu, "Bias-Field-Free Microwave Oscillator Driven by Perpendicularly Polarized Spin Current," IEEE Transactions on Magnetics, P2670 VOL. 42, No. 10 (2006)

[Non-Patent Document 2] J. G. Zhu, X. Zhu and Y. Tang, "Microwave Assisted Magnetic Recording," IEEE Transactions on Magnetics, p. 125, vol. 44, No. 1 (2008)

[Non-Patent Document 3] Y. Wang, Y Tang and J. G. Zhu, "Media damping constant and performance characteristics in microwave assisted magnetic recording with circular ac field," Journal of Applied Physics, 105, 07B902 (2009)

SUMMARY OF THE INVENTION

In microwave-assisted magnetic recording, it is desirable that a high frequency field generated from a spin oscillator continues to be applied at certain strength to a recording medium during recording. In other words, it is desirable that magnetization of a field generation layer of the spin torque oscillator is in a steady state where it rotates at a constant speed and at a constant angle. However, in a magnetic recording and reproducing apparatus, there are some cases in which the oscillation state becomes temporarily unstable because the spin torque oscillator generates heat when a head comes in contact with a medium or because a disturbing magnetic field is applied to the spin torque oscillator. In a part where the oscillation state is unstable, a problem of a write error occurs because recording cannot be adequately assisted. Whether or not a write error has occurred cannot be judged from signals obtained by reading recording patterns written onto a recording medium. Write errors due to unstable oscillation will be a factor for reduced reliability in the magnetic recording and reproducing apparatus using the microwave-assisted magnetic recording system.

In the present invention, a resistance value of a spin torque oscillator is monitored to detect that oscillation becomes unstable during recording. When magnetization of a field generation layer in the spin torque oscillates steadily, the spin torque oscillator shows a constant resistance value. When the oscillation becomes unstable, the resistance value changes from the value in the steady oscillation. The reasons are as follows: A field generation layer and a spin injection layer of the spin torque oscillator are arranged across a nonmagnetic layer, and cause giant magnetoresistance effect or tunnel magnetoresistance effect. Specifically, when an relative angle between magnetization of the field generation layer and magnetization of the spin injection layer changes, the resistance values of the spin torque oscillator changes.

When the spin torque oscillator steadily oscillates, magnetization of the field generation layer of the spin torque oscillator rotates keeping a certain angle with magnetization of the spin injection layer. In other words, when oscillating steadily, the spin torque oscillator has a constant resistance value. In contrast, when the spin torque oscillator oscillates unstably, the relative angle between magnetization of the field generation layer and that of the spin injection layer differ from that in the steady state, and the spin torque oscillator also shows a resistance value different from that during steady oscillation. Therefore, if abnormality of a resistance value of the spin torque oscillator is detected, it can be learned that assistance effect has become inadequate due to unstable oscillation and a write error has occurred.

If it can be judged that a write error has occurred, the error can be corrected by overwriting the part having the write error again, or rewriting a signal having the write error to a different location on the recording medium, This enables enhancement of the reliability of the magnetic recording and reproducing apparatus.

A magnetic recording and reproducing apparatus according to the present invention has a magnetic recording medium, a medium driving section for driving the magnetic recording medium, a magnetic head including a write head for performing a recording operation on the magnetic recording medium and a read head for reading information recorded on the magnetic recording medium, and a head driving section for moving the magnetic head to a position above a desired track of the magnetic recording medium. The write head includes a pole for generating a writemagnetic field and a spin torque oscillator for generating a high frequency field. The magnetic recording and reproducing apparatus also has a resistance measurement section for measuring a resistance value of the spin torque oscillator during a recording operation on the magnetic recording medium by the write head. With this configuration, the magnetic recording and reproducing apparatus rewrites the information for which the recording operation is already performed when a measured resistance moves out of a predefined normal range.

A microwave-assisted magnetic recording method according to the present invention has steps of: performing a recording operation by applying a writemagnetic field from a pole, and applying a high frequency field from a spin torque oscillator; measuring a resistance value of the spin torque oscillator during the recording operation; judging whether or not the measured resistance value is in a predefined normal range; and when it is judged that the measured resistance value is out of the predefined normal range, rewriting information for which the recording operation is already performed.

According to the present invention, a write error due to unstable oscillation of a spin torque oscillator can be modified, and a reliable magnetic recording and reproducing apparatus can be provided.

Any problem, configuration, and effect other than those described above will become apparent through the following description of the preferred embodiment.

DESCRIPTION OF THE PREFERRED EMBODIMENTS

Description will be given below with regard to embodiments of the present invention with reference to the accompanying drawings. To facilitate understanding, the description will be given by assigning a same symbol to a same functional part throughout the following figures.

Figure 1:
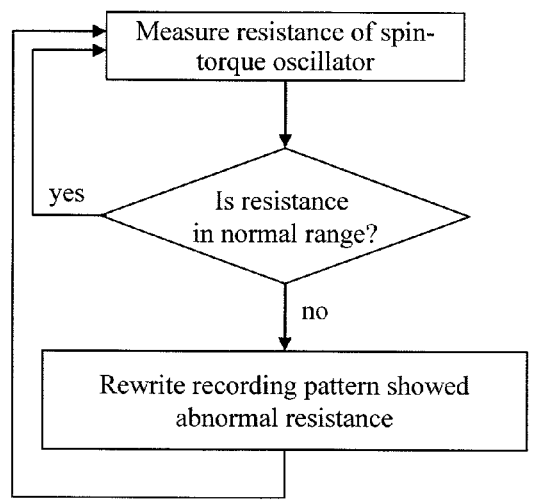
FIG. 1 is a flow chart showing an example of operation of microwave-assisted magnetic recording system according to the present invention.

FIG. 1 is a flow chart showing an example of operation of microwave-assisted magnetic recording system according to the present invention. It is desirable that a spin torque oscillator has generated constant high frequency fields in a recording process. When oscillation is normal, the spin torque oscillator maintains a constant resistance value. If measurement of resistance of the spin torque oscillator continues during recording and it is detected that resistance fluctuates and moves out of the normal range, a write error can be modified by rewriting information in that range.

Figure 2:
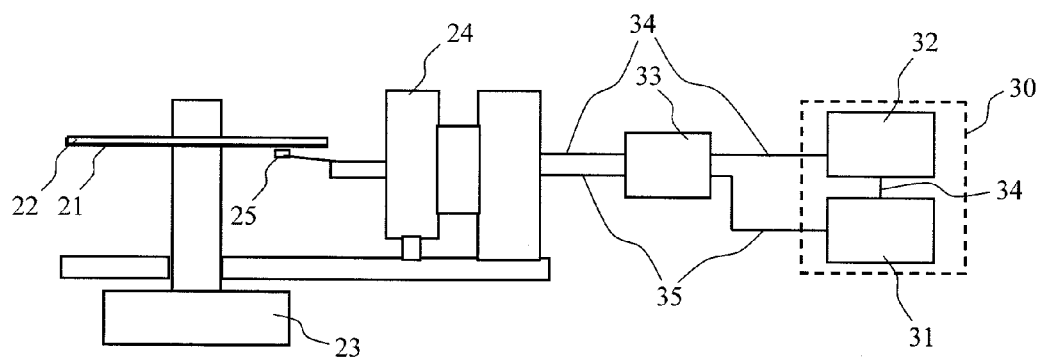
FIG. 2 is a schematic diagram showing a configuration example of a magnetic recording and reproducing apparatus according to the present invention.

FIG. 2 is a schematic diagram showing a configuration example of a magnetic recording and reproducing apparatus which realizes the microwave-assisted magnetic recording system of the present invention.

A disk holding a magnetic recording medium 21 for magnetically recording information is rotated by a spindle motor 23, and a head slider 25 is guided to a desired track on the disk by an actuator 24. Specifically, the mechanisms cause a read head, a write head, and a spin torque oscillator which are formed on the head slider 25 to make a relative motion adjacent to a predetermined recording position on the disk 22 and to sequentially write and read a signal. It is desirable that the actuator 24 is a rotary actuator.

A write signal which is generated from a HDC (Hard disk controller) 31 in a SOC (System on chip) is encoded in a channel 32, and recorded on the magnetic recording medium by the write head via a preamplifier 33. In a magnetic recording and reproducing apparatus using the microwave-assisted magnetic recording system, electric conduction of a spin torque oscillator is also performed together with recording, and electricity is conducted from the HDC 31 to the spin torque oscillator via the preamplifier 33. Output of the read head is amplified by the preamplifier 33, decoded by the channel 32, and inputted to HDC 31. In the figure, 34 represents an input/output path of a recording/reading system and 35 represents an input/output path of the spin torque oscillator.

In addition, when the read head is caused to move to a desirable recording track, the head slider can be positioned by detecting a position on the track with highly sensitive output from the read head, and controlling the actuator. In this figure, although one each of the head slider 25 and the disk 2 is shown, they may be more than one. In addition, the disk 22 may have the magnetic recording medium 21 on both sides to record information. When information is recorded on both sides of the disk, the head slider 25 is arranged on both sides of the disk.

The magnetic recording and reproducing apparatus continues to measure a resistance value of the spin torque oscillator with the preamplifier 33 during a recording operation. The measured resistance value of the spin torque oscillator is sent to the HDC 31 in the SOC 30. When a flag indicating that resistance fluctuates and moves out of the normal range is set in the HDC 31, HDC 31 issues a rewrite instruction, and a signal having an error in recording is encoded in the channel 32 and recorded in the magnetic disk via the preamplifier 33, similar to the case of normal recording. It may be in the preamplifier 33 not in the HDC 31 that the flag indicating that resistance moves out of the normal range is set. In this case, a signal on whether or not the signal moves out of the normal range, rather than information on a resistance value, is sent to the HDC 31.

Re-recording may be performed immediately after resistance abnormality has occurred or immediately after recording of a minimum information recording unit block (it varies depending on a drive, such as 512 bytes or 4 kilobytes and the like) has ended.

A method for defining a normal resistance range and a method for measuring a resistance value of a spin torque oscillator will be described in detail hereinafter.

Figure 3:
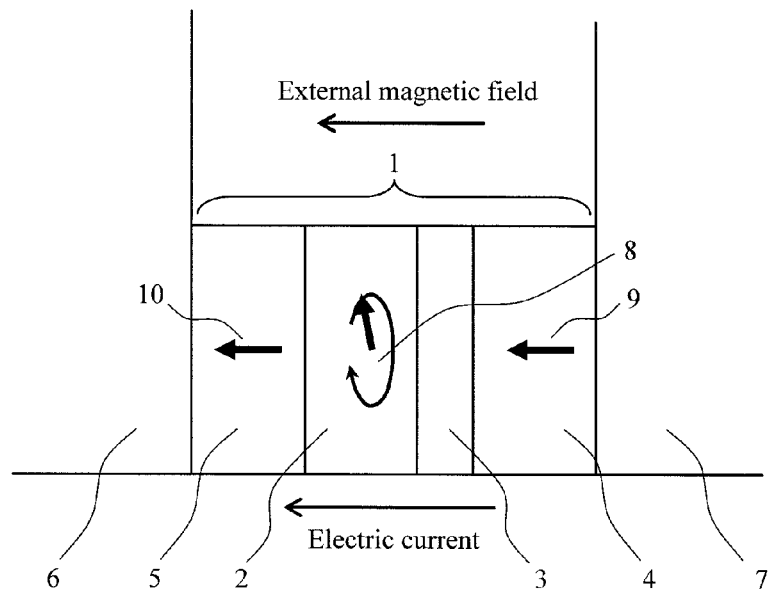
FIG. 3 is a view showing a configuration example of a general spin torque oscillator.

FIG. 3 shows an example of a general configuration of a spin torque oscillator to be used in microwave-assisted magnetic recording. The spin torque oscillator 1 has such a structure that a laminated layer composed of a rotating guide layer 5/field generation layer 2/nonmagnetic intermediate layer 3/spin injection layer 4 is formed in a direction of head running, and it is sandwiched by a main pole 7 and a shield 6 on a trailing side. In FIG. 3, although the spin injection layer 4 is adjacent to the main pole 7 and the rotating guide layer 5 is adjacent to the trailing shield 6, the structure may be such that the spin injection layer is adjacent to the trailing shield and the rotating guide layer is adjacent to the main pole. Magnetic anisotropy of the rotating guide layer 5 and the spin injection layer 4 is made perpendicular to a film surface. In addition, if the structure is such that an external magnetic field is applied in a direction perpendicular to the film surface of the spin torque oscillator 1, there may be no rotating guide layer 5. A method for utilizing as an external magnetic field a part of a writemagnetic field generated from the main pole 7 is common. Flow of currents to the spin torque oscillator 1 is continued so that electrons flow in a direction perpendicular to the film surface. Oscillation of the spin torque oscillator, that is to say, high-speed rotation of field generation layer magnetization 8, is caused by balancing of spin torques of electrons and an exchange coupling field with the rotating guide layer or the external magnetic field.

As shown in FIG. 3, the field generation layer 2 and the spin injection layer 4 of the spin torque oscillator 1 are arranged, being separated by the nonmagnetic intermediate layer 3, causing giant magnetoresistance effect or tunnel magnetoresistance effect. Specifically, when relative angles of the magnetization 8 of the field generation layer 2 and the magnetization 9 of the spin injection layer 4 change, the resistance value of the spin torque oscillator 1 changes. When the spin torque oscillator steadily oscillates, the magnetization 8 of the field generation layer 2 of the spin torque oscillator rotates keeping a certain angle with the magnetization 9 of the spin injection layer 4. Consequently, when it steadily oscillates, the resistance value of the spin torque oscillator 1 is also constant. In contrast, when it is in unstable oscillation state, the relative angles of the magnetization 8 of the field generation layer 2 and the magnetization 9 of the spin injection layer 4 differ from those in the steady state, and the spin torque oscillator 1 also shows a different resistance value than that during steady oscillation.

In the information recording process of the magnetic recording and reproducing apparatus, information is recorded by applying a magnetic field to a recording medium while switching polarity of the magnetic field from a main pole of the write head. The high frequency assisted magnetic recording system includes a system for changing a rotating direction of a high frequency field from a spin torque oscillator in accordance with polarity of the magnetic flux from a main pole and a system for regulating a rotating direction of a high frequency field independent of polarity of the magnetic flux from the main pole.

In the system for changing a rotating direction of a high frequency field from a spin torque oscillator in accordance with polarity of the magnetic field from a main pole, the rotating direction of a high frequency field is inverted by switching magnetization of the spin injection layer and the rotating guide layer according to a change of polarity in the magnetic field of the main pole. Since a magnetic field to be generated from the main pole is applied to the spin torque oscillator as well as to a recording medium, the method for using the magnetic field from the main pole is common to switch polarity of the magnetization of the spin injection layer.

Figure 4:
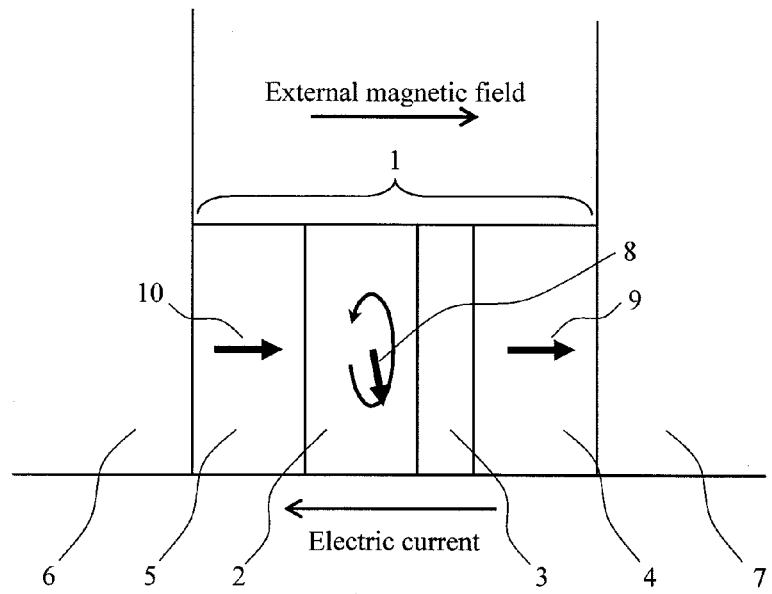
FIG. 4 is a view showing a configuration example of the general spin torque oscillator.

FIG. 4 is a schematic view of the spin torque oscillator shown in FIG. 3 of when the magnetization directions of the spin injection layer and the rotating guide layer are switched. Even when the magnetization directions 9, 10 of the spin injection layer 4 and the rotating guide layer 5 are switched, relative angles of the magnetization 8 of the field generation layer and the magnetization 9 of the spin injection layer 4 remain unchanged from those before switching. If the spin injection layer magnetization 9 is switched according to a magnetic field from the main pole 7, the relative angles of the spin injection layer magnetization 9 and the field generation layer magnetization 8 temporarily change in the process in which the spin injection layer magnetization 9 switches. Although the spin injection layer magnetization 9 switches while precessing in a film in-plane direction, its frequency differs from frequency of the magnetization 8 of the field generation layer 2. This is because in general, different materials are used for the spin injection layer 4 and the field generation layer 2, and damping factors are different. Therefore, the spin injection layer magnetization 9 switches while going through states in which the relative angles of the spin injection layer magnetization 9 and the field generation layer magnetization 8 are temporarily parallel/antiparallel. When the spin injection layer magnetization 9 and the field generation layer magnetization 8 are parallel, a resistance value of the spin torque oscillator 1 will be lowest, due to giant magnetoresistance effect or tunnel magnetoresistance effect. The value will be highest when they are antiparallel.

Figure 5:
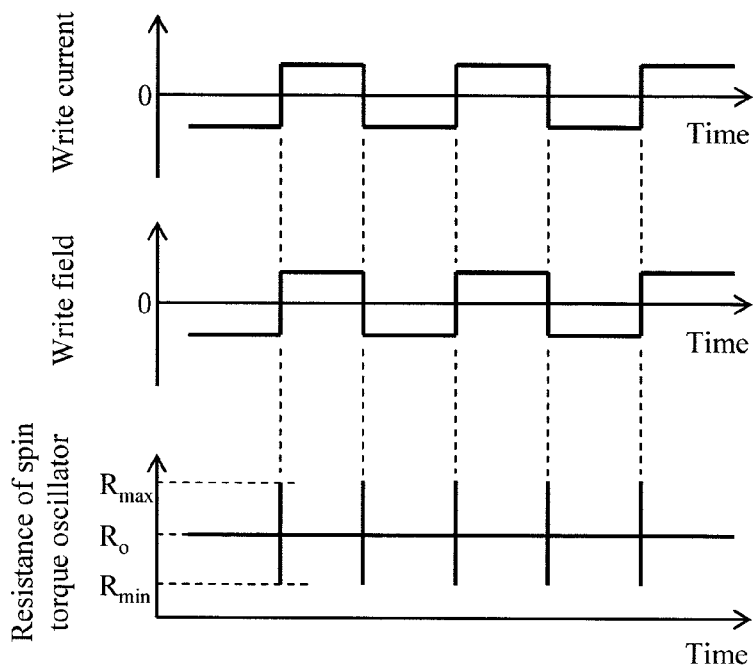
FIG. 5 is a schematic diagram showing ideal change of resistance in a spin torque oscillator of a system which switches magnetization of a spin injection layer according to a write signal.

FIG. 5 shows ideal behavior for a write current to be applied to a coil which energizes the main pole, a writemagnetic field to be generated from the main pole, and time of a resistance value of the spin torque oscillator. A resistance value of the spin torque oscillator in steady oscillation state is Ro. As shown in the figure, the writemagnetic field from the main pole changes in response to the write current, and resistance of the spin torque oscillator temporarily increases or decreases according to switching of polarity of the writemagnetic field. A maximum resistance value which appears when the write current is switched is $R_{max}$, and a minimum resistance value is $R_{min}$.

Figure 6:
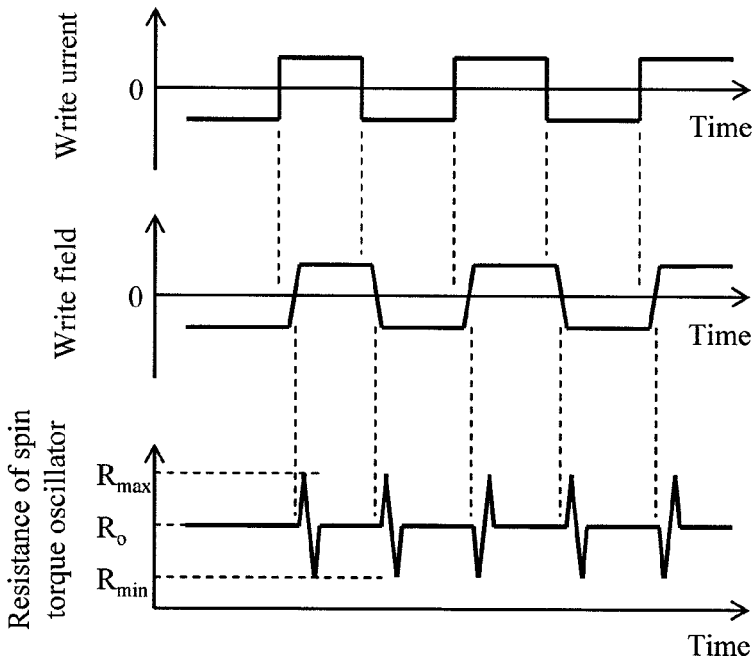
FIG. 6 is a schematic diagram showing resistance change in the spin torque oscillator of the system which switches magnetization of the spin injection layer according to the write signal.

However, in reality, due to a delay generated in magnetization switching in the time direction, the behavior will be as shown in FIG. 6. In general, the writemagnetic field is delayed about 100 ps to a change in the write current, and magnetization switching of the spin injection layer of the spin torque oscillator also takes about 100 to 200 ps. In addition, in the magnetization switching process of the spin injection layer, as it depends on relative angles of the oscillation layer magnetization and the spin injection layer magnetization when switching of the spin injection layer magnetization begins how resistance of the spin torque oscillator increases or decreases, it will be random whether resistance falls after it goes high or whether it goes high after it falls. In addition, depending on a difference in configuration of a spin torque oscillator, a difference in frequencies of the oscillation layer and the spin injection layer varies, and the varying difference of the frequencies decides whether an increase or decrease of resistance will end in one cycle or take place in more than one cycle.

In any case, depending on whether or not the nonmagnetic intermediate layer 3 is an electric conducting layer, resistance of the spin torque oscillator changes on the principle of giant magnetoresistance effect or tunnel magnetoresistance effect. If the spin torque oscillator 1 operates normally, resistance thereof will have a value between a minimum value $R_{min}$ when the spin injection layer magnetization 9 and the Field Generation layer magnetization 8 are parallel and a maximum value $R_{max}$ when they are antiparallel.

Figure 7:
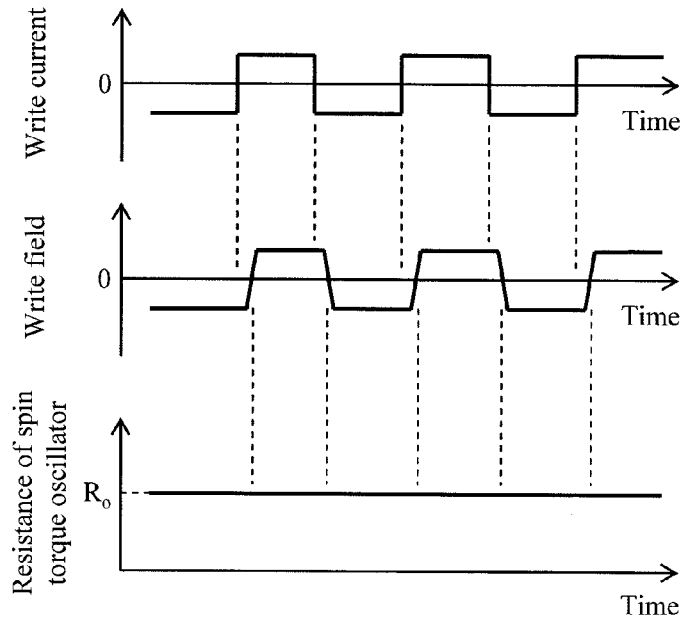
FIG. 7 is a schematic view showing resistance change in a spin torque oscillator of a system which does not switch magnetization of a spin injection layer according to a write signal.

On the one hand, for the system for regulating the rotating direction of the high frequency field from the spin torque oscillator independent of polarity of the magnetic flux from the main pole, as shown in FIG. 7, a resistance value of the spin torque oscillator is always Ro in the steady oscillation state.

The methods for conducting electricity to the spin torque oscillator includes a constant current driving system which continues to apply a constant direct-current electricity and a constant voltage driving system which continues to apply a constant direct-current voltage. The constant current driving system can measure a resistance value of the spin torque oscillator by continuously measuring voltages, while the constant voltage driving system can measure a resistance value of the spin torque oscillator by continuously measuring currents.

Figure 8:
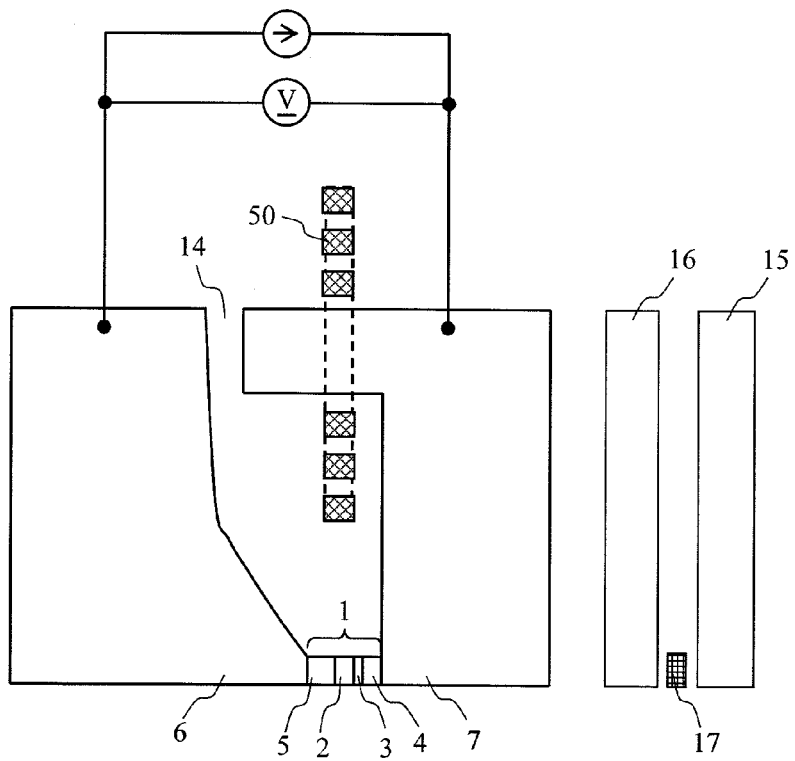
FIG. 8 is a schematic diagram showing one example of a magnetic head which incorporates a spin torque oscillator of a constant current driving type.

FIG. 8 is a schematic diagram showing one example of a magnetic head which incorporates a spin torque oscillator of a constant current driving type.

The magnetic head includes a write head for performing recording on a magnetic recording medium and a read head for reading information recorded on the magnetic recording medium. The write head has a spin torque oscillator 1 for generating high frequency fields, a main pole 7 for generating writemagnetic fields, and a coil 50 for energizing the main pole. The main pole 7 and a trailing shield 6 are electrically insulated by an insulating region 14 provided at a position above in a flying height direction away from a medium opposed face. The read head has a read sensor 17 such as a TMR element or a GMR element arranged, being sandwiched by a lower magnetic shield 15 and an upper magnetic shield 16. The spin torque oscillator 1 is placed so as to be sandwiched by the main pole 7 of the write head and the trailing shield 6. When a write current is applied to the coil 50, a writemagnetic field is generated from the main pole 7. Since a part of the writemagnetic field is also applied to the spin torque oscillator 1, polarity of a magnetic field to be applied to the spin torque oscillator 1 also switches when polarity of the writemagnetic field switches. For the system for changing the rotating direction of the high frequency field in accordance with polarity of the magnetic field from the main pole 7, polarity of magnetization of the spin injection layer 4 is switched by using the writemagnetic field. Electric conduction to the spin torque oscillator 1 is performed with the main pole 7 of the write head and the trailing shield 6 as an electrode. Resistance of the spin torque oscillator 1 can be measured by measuring a voltage on the path.

Figure 9:
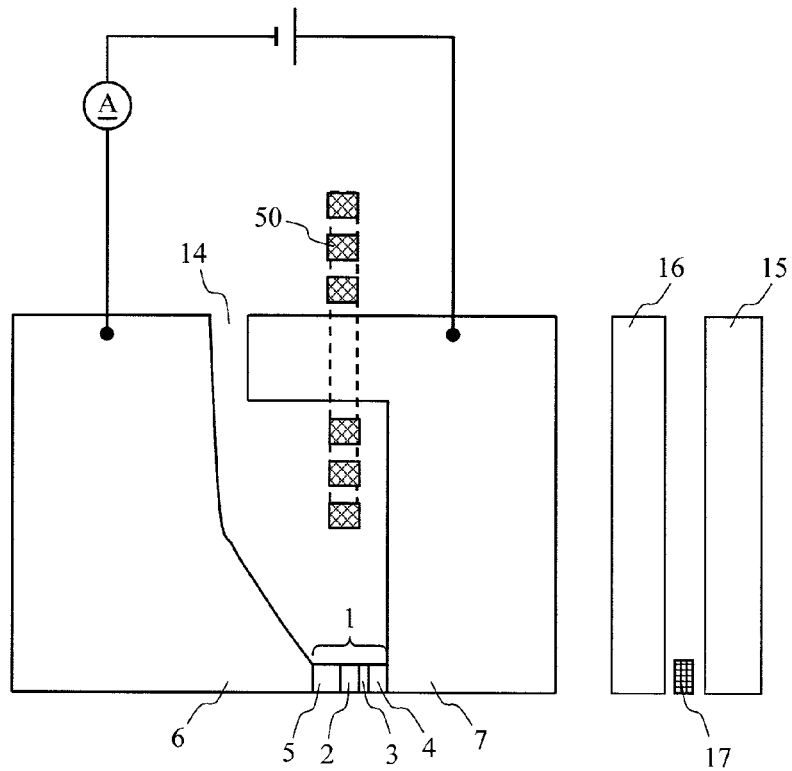
FIG. 9 is a schematic diagram showing one example of a magnetic head which incorporates a spin torque oscillator of a constant voltage driving type.

FIG. 9 is a schematic diagram showing one example of a magnetic head using a spin torque oscillator of the constant voltage driving type. In this case, resistance of the spin torque oscillator can be measured by measuring a current on the path.

A resistance value Ro of the spin torque oscillator in steady oscillation state can be determined as follows.

For the constant current driving system, a method for determining Ro is as follows. First, the head is loaded onto a recording medium. Then, it is desirable to control flying height by a heater incorporated in a head slider, under the same conditions as those when recording a normal signal. This is because temperatures of the head slider varies depending on whether the heater is turned on or off, and resistance of the spin torque oscillator also changes. Then, a direct-current electricity Io is applied to the spin torque oscillator similar to the case as with the case of recording a normal signal. A write current Iw is applied to the coil while direct current electricity Io is applied to the spin torque oscillator, and a direct-current magnetic field is applied from the main pole in a perpendicular direction to a film surface of the spin torque oscillator. Then, polarity of the direct current magnetic field is not changed. Then, the spin torque oscillator maintains state to perform constant oscillation. In the constant current driving system, a preamplifier measures a voltage in this state for certain period, such as 1 second, and an HDC determines an average value Vo. A value to be obtained by dividing Vo by Io is Ro. Measured Ro is stored in a management area on a magnetic disk or in a memory.

On the one hand, a method for determining Ro for the constant voltage driving system is same as the constant current driving system except for that a direct-current voltage is applied to the spin torque oscillator and that a current value is measured for measurement of resistance.

A method for measuring $R_{max}$ and $R_{min}$ in the case of the constant current driving method will be described hereinafter. First, a head will be loaded onto a recording medium. Then, it is desirable to control flying height by a heater incorporated in a head slider, under the same conditions as those when recording a normal signal. Next, a direct current electricity Io is applied to a spin torque oscillator as with the case of recording a normal signal. A recording alternating-current Iw is applied to the coil while direct current electricity Io is applied to the spin torque oscillator, and an alternating-current magnetic field is applied from the main pole in a perpendicular direction to a film surface of the spin torque oscillator. Then, the spin torque oscillator performs oscillation while switching magnetization of the spin injection layer at certain intervals. In the constant current driving system, a preamplifier measures a peak value of voltage in this state for certain period, such as 1 second, and an HDC obtains an average value $V_{max}$ and $V_{min}$ of a positive voltage peak value and a negative voltage peak value, respectively. Values to be obtained by dividing $V_{max}$ and $V_{min}$ by I0 are $R_{max}$ and $R_{min}$. Measured $R_{max}$ and $R_{min}$ are stored in a management area on a magnetic disk or stored in a memory.

In addition, a delay amount of the spin torque oscillator for the write current is determined by measuring a phase difference of fluctuations of the alternating-current write current Iw and voltages of the spin torque oscillator, and is stored in the management area or stored in the memory, similar to $R_{max}$ and $R_{min}$.

On the one hand, a method for determining $R_{max}$ and $R_{min}$ in the case of the constant voltage driving system is similar to the constant current driving system except for that that a direct-current voltage is applied to the spin torque oscillator and that a current value is measured for measurement of resistance.

Another method for measuring $R_{max}$ and $R_{min}$ in the case of the constant current driving system will be described hereinafter.

In this method, measurement takes place with the head unloaded. A direct-current electricity Io is applied, with the head unloaded, as with the case of recording a normal signal. A write current Iw is applied to the coil while direct current electricity Io is applied to the spin torque oscillator, and a direct-current magnetic field is applied from the main pole in a perpendicular direction to a film surface of the spin torque oscillator.

This is the state I which the spin torque oscillator has constantly oscillated, and the preamplifier measure voltage then for a certain period such as 1 second, and the HDC determines an average value $V_{o\_unload}$. A value to be obtained by dividing the $V_{o\_unload}$ by Io is $R_{o\_unload}$. Then, with the head unladed, an alternating write current Iw is applied to the coil while direct current electricity to is applied to the spin torque oscillator, and an alternating-current magnetic field is applied from the main pole in a perpendicular direction to a film surface of the spin torque oscillator. The preamplifier measures a peak value of voltage in this state for a certain period such as 1 second, and the HDC obtains an average value $V_{max\_unload}$ and $V_{min\_unload}$ of a positive voltage peak value and a negative voltage peak value, respectively. Since the heater controls flying height in actual recording, temperatures of the slider rise and resistance of the spin torque oscillator increases. Thus, Ro with the head loaded is then determined with the method described earlier.

$R_{max}$ will be $R_{max}=Ro+(R_{max\_unnload}-R_{o\_unload})$, and
$R_{min}$ will be $R_{min}=R_o-(R_{o\_unload}-R_{max\_unload})$.

In addition, a delay amount of the spin torque oscillator for the write current is determined by measuring a phase difference of fluctuations of the alternating-current write current Iw and voltages of the spin torque oscillator, and is stored in the management area or stored in the memory, similar to $R_{max}$ and $R_{min}$.

On the one hand, another method for determining $R_{max}$ and $R_{min}$ in the case of the constant voltage driving system is similar to the constant current driving system except for that that a direct-current voltage is applied to the spin torque oscillator and that a current value is measured for measurement of resistance.

Figure 10:
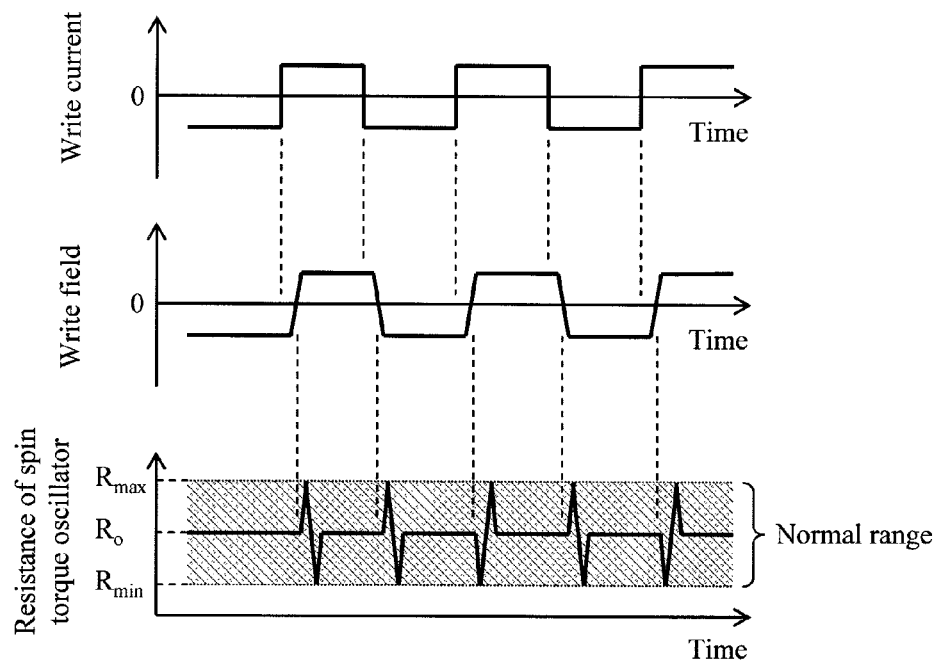
FIG. 10 is a view showing a first method for defining a normal resistance range in a spin torque oscillator.

FIG. 10 is a view illustrating a first method for defining a normal resistance range of a spin torque oscillator in the system for changing the rotating direction of high frequency field from the spin torque oscillator in accordance with polarity of the magnetic field from the main pole. As shown in FIG. 10, the method defines a normal range of the resistance value of the spin torque oscillator as a range from $R_{min}$ to $R_{max}$, which is equivalent to a range of resistance due to giant magnetoresistance effect or tunnel magnetoresistance effect of the spin torque oscillator. As illustrated in FIG. 5 and FIG. 6, the range from $R_{min}$ to $R_{max}$ is equivalent to the range of resistance change due to giant magnetoresistance effect or tunnel magnetoresistance effect caused by magnetization of the spin injection layer and magnetization of the field generation layer contained in the spin torque oscillator. Although the resistance values Ro, $R_{max}$, $R_{min}$ widely differs depending on the size or components of the spin torque oscillator. For example, in the spin torque oscillator which uses an oxidation layer for the nonmagnetic intermediate layer at write track width of 40 nm and element height of 40 nm, By way of example, Ro is 500 ohms, $R_{max}$ 600 ohms, and $R_{min}$ about 400 ohms.

Figure 11:
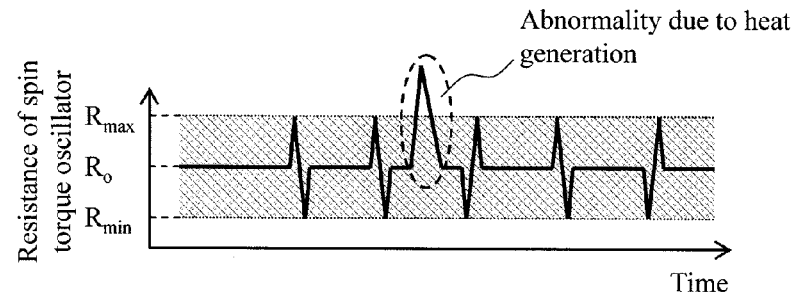
FIG. 11 is a view showing effects of the first method for defining the normal resistance range in the spin torque oscillator.

As shown in FIG. 11, the method for defining can detect that mainly, the head has come in contact with the medium and generated heat, and a resistance value has widely fluctuated. Consequently, a write error which occurs as the microwave-assisted effect is reduced due to the contact of the head and medium can be modified, and reliability of the magnetic recording and reproducing apparatus can be enhanced than ever before.

Figure 12:
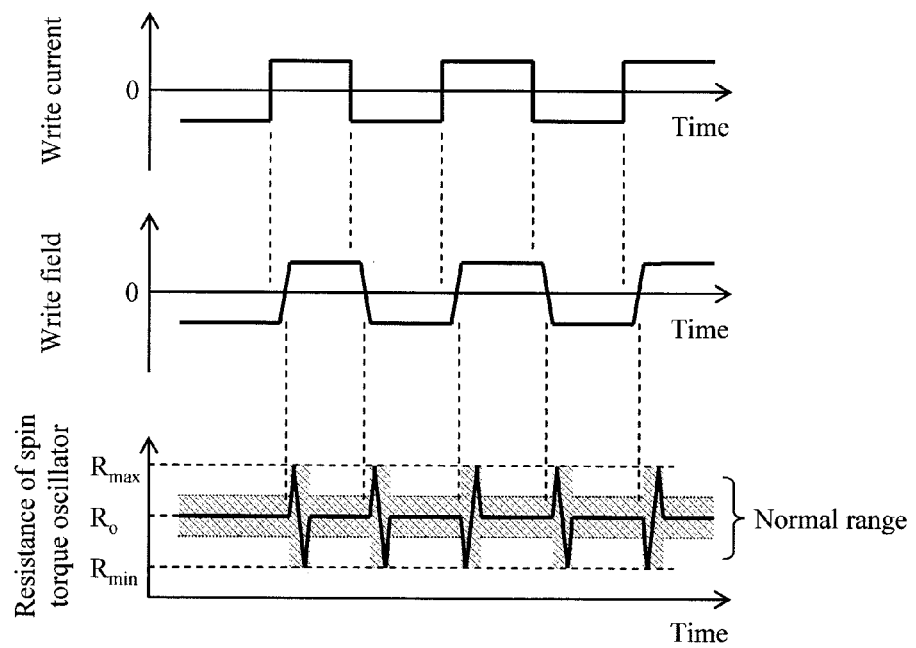
FIG. 12 is a view showing a second method for defining a normal resistance range in a spin torque oscillator.

FIG. 12 is a view illustrating a second method for defining a normal resistance range of a spin torque oscillator in the system for changing the rotating direction of high frequency field from the spin torque oscillator in accordance with polarity of the magnetic field from the main pole. As shown in FIG. 12, the method defines a normal range of the resistance value of the spin torque oscillators as the range from $R_{min}$ to $R_{max}$ which is equivalent to the range of resistance change due to giant magnetoresistance effect or tunnel magnetoresistance effect of the spin torque oscillator when the writemagnetic field switches, and as $R_o$ in the steady oscillation state±10% for any other period. Recording is performed again if a resistance value of the spin torque oscillator moves out of the range. Although it depends on a configuration of the spin torque oscillator, the assist effect on recording is less than 60% of the normal case if Ro changes beyond ±10%. Consequently the normal range of the resistance value of the spin torque oscillator for any period other than switching of the writemagnetic field is set to $R_o \pm 10\%$.

Since an amount of delay of magnetization switching of the spin injection layer of the spin torque oscillator for polarity switching of the write current Iw has been determined in advance, timing of magnetization switching of the spin injection layer is known. For ±100 to 200 ps before or after the timing of magnetization switching, resistance change from $R_{min}$ to $R_{max}$ is allowed. ±100 to 200 pm correspond to time taken for the magnetization switching of the spin injection layer.

Figure 13:
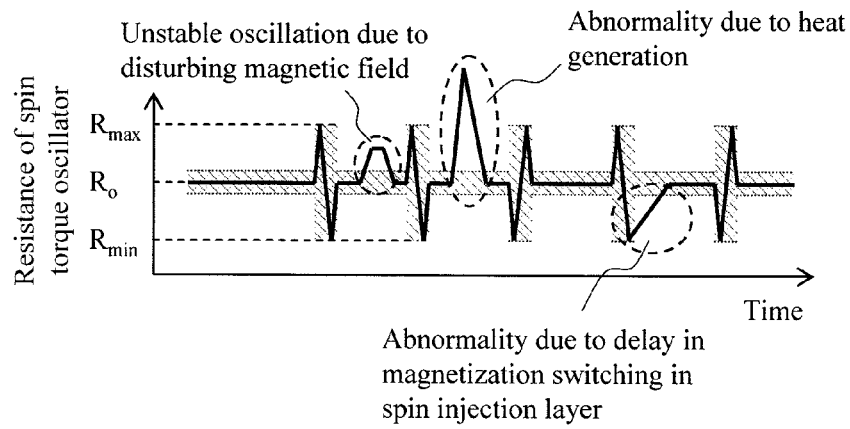
FIG. 13 is a view showing effects of the second method for defining the normal resistance range in the spin torque oscillator.

In this case, as shown in FIG. 13, the method for defining can detect not only that mainly, the head comes in contact with the medium and generates heat, and a resistance value has widely fluctuated but also that a disturbing magnetic field is applied to the spin torque oscillator, and thus magnetization arrangement of the field generation layer is disrupted and oscillation becomes unstable, or that magnetization switching of the spin injection layer is delayed and high frequency assistance becomes inadequate, and the like. Consequently, a write error which occurs as the microwave assisted effect is degraded due to various reasons can be modified and reliability of the magnetic recording and reproducing apparatus can be enhanced than ever before.

Figure 14:
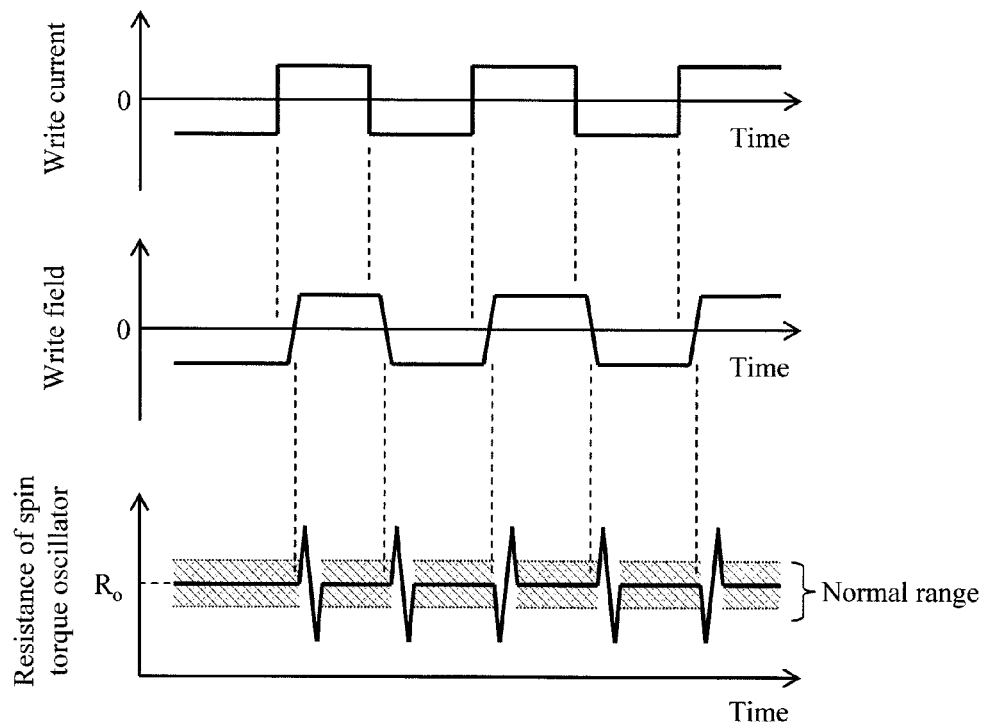
FIG. 14 is a view showing a third method for defining a normal resistance range in a spin torque oscillator.

In the system for changing the rotating angle of the high frequency field from the spin torque oscillator in accordance with polarity of the magnetic field from the main pole, as shown in FIG. 14, as a third method for defining a normal resistance range of the spin torque oscillator, there is a method for judging a resistance value of the spin torque oscillator in any period other than during the writemagnetic field switching, and not judging a resistance value of the spin torque oscillator during the writemagnetic field switching. A normal range of the resistance value of the spin torque oscillator is defined within $R_o \pm 10\%$ in the steady oscillation state, and recording is redone if the value moves out of the range. Since an amount of delay of magnetization switching of the spin injection layer of the spin torque oscillator for polarity switching of the write current Iw has been determined in advance, timing of magnetization switching of the spin injection layer is known. For ±1100 to 200 ps before or after the timing of magnetization switching, resistance of the spin torque oscillator is not measured. Alternatively, even if resistance of the spin torque oscillator is measured, the value is ignored. A time period±100 to 200 ps corresponds to time taken for the magnetization switching.

Figure 15:
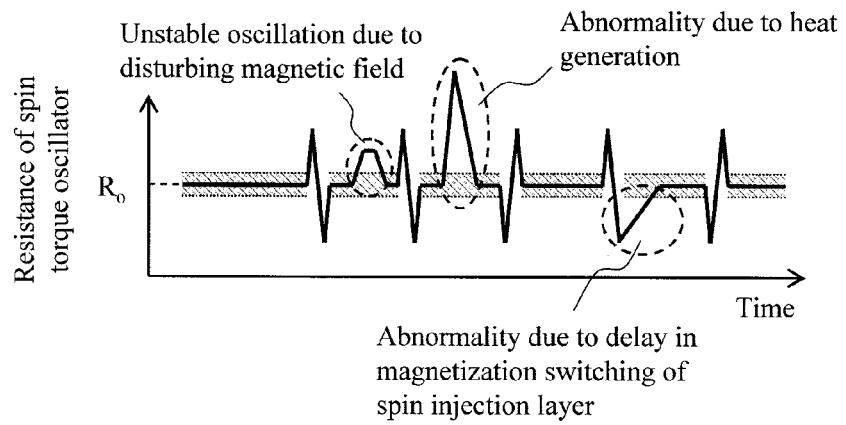
FIG. 15 is a view showing effects of the third method for defining the normal resistance range in the spin torque oscillator.

In this case, as shown in FIG. 15, the method for defining can detect not only that mainly, the head comes in contact with the medium and generates heat, and a resistance value has widely fluctuated but also that a disturbing magnetic field is applied to the spin torque oscillator, and thus magnetization arrangement of the field generation layer is disrupted and oscillation becomes unstable, or that magnetization switching of the spin injection layer is delayed and high frequency assistance becomes inadequate, and the like. Consequently, a write error which occurs as the microwave assisted effect is degraded due to various reasons can be modified and reliability of the magnetic recording and reproducing apparatus can be enhanced than ever before.

Figure 16:
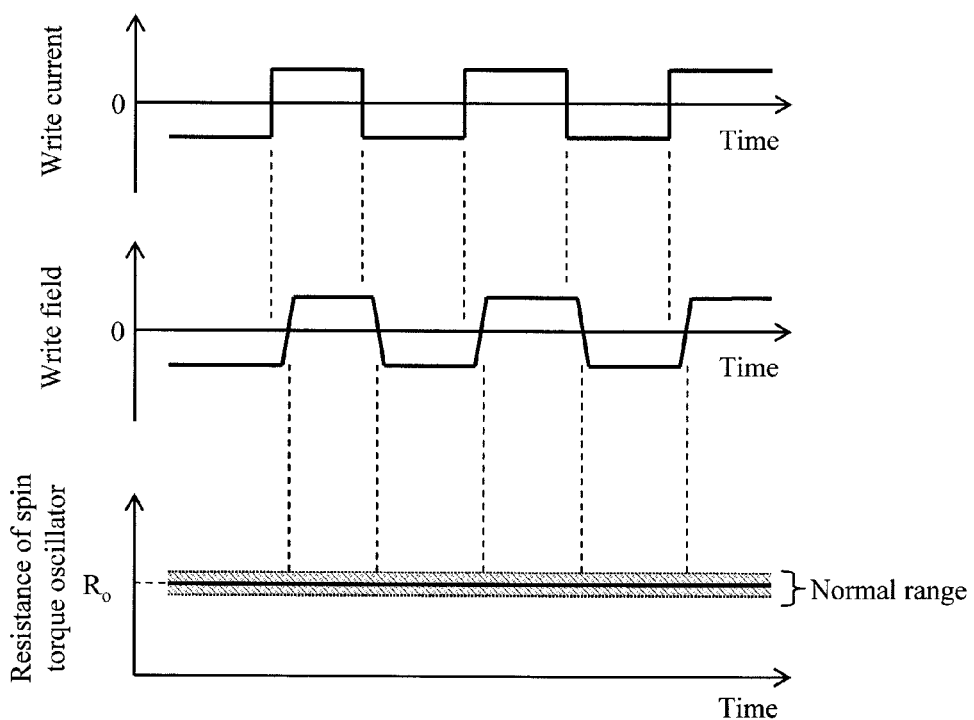
FIG. 16 is a view showing a method for defining a normal resistance range in a spin torque oscillator of a system which does not switch magnetization of a spin injection layer according to a write signal.

As a method for defining the normal resistance range of the spin torque oscillator in the system for regulating the rotating direction of the high frequency field from the spin torque oscillator independent of polarity of the magnetic flux from the main pole, as shown in FIG. 16, there is a method for defining the normal range of the resistance value of the spin torque oscillator within $R_o \pm 10\%$ in the steady oscillation state, and redoing recording if the value moves out of the range.

Figure 17:
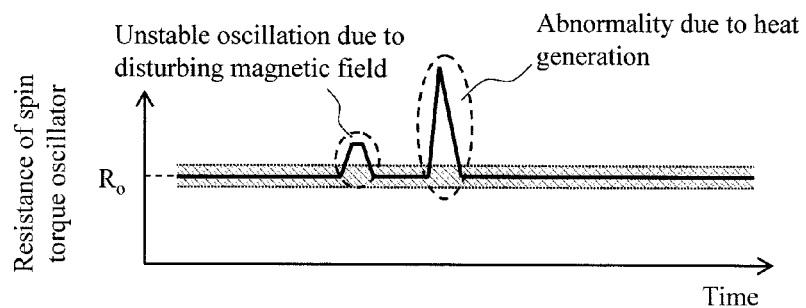
FIG. 17 is a view showing effects of the method for defining the normal resistance range in the spin torque oscillator of the system which does not switch the spin injection layer according to a write signal.

In this case, as shown in FIG. 17, the method can detect that the method for defining can detect not only that mainly, the head comes in contact with the medium and generates heat, and a resistance value has widely fluctuated but also that a disturbing magnetic field is applied to the spin torque oscillator, and thus magnetization arrangement of the field generation layer is disrupted and oscillation becomes unstable, and the like. Consequently, a write error which occurs as the microwave assisted effect is degraded due to various reasons can be modified and reliability of the magnetic recording and reproducing apparatus can be enhanced than ever before.

Figure 18:
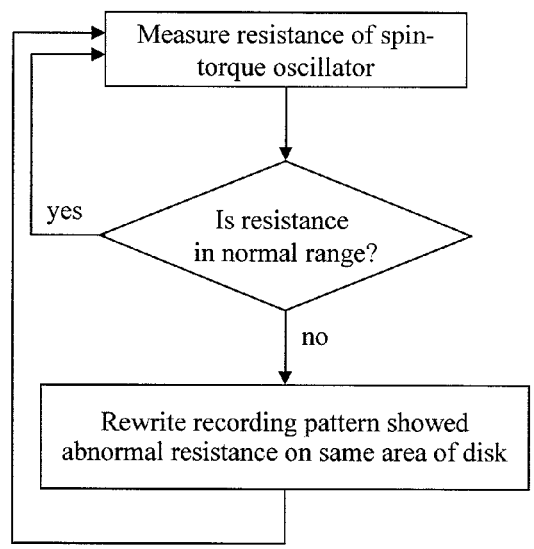
FIG. 18 is a flow chart showing an example of operation of the microwave-assisted magnetic recording system according to the present invention.

FIG. 18 is a flowchart showing another example of operation of the microwave assisted magnetic recording system according to the present invention.

If measurement of resistance of the spin torque oscillator continues during recording and it is detected that resistance of the spin torque oscillator fluctuates and moves out of the range, a write error is corrected by rewriting recording patterns in that range onto a same location on the recording medium.

Figure 19:
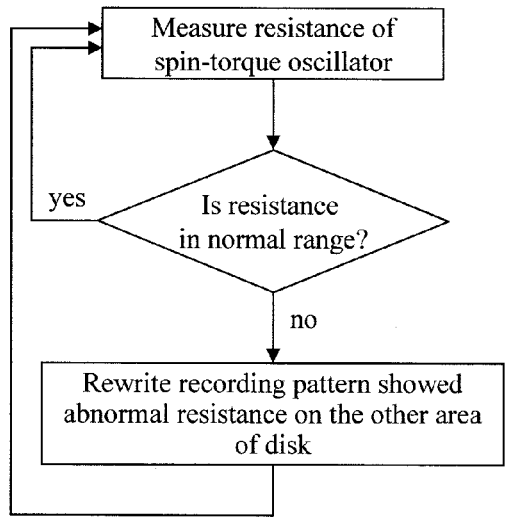
FIG. 19 is a flow chart showing an example of operation of the microwave-assisted magnetic recording system according to the present invention.

FIG. 19 is a flowchart showing another example of operation of the microwave assisted magnetic recording system according to the present invention.

If measurement of resistance of the spin torque oscillator continues during recording and it is detected that resistance of the spin torque oscillator fluctuates and moves out of the range, a write error is corrected by rewriting recording patterns in that range onto a different location on the recording medium.

In addition, a location on the medium where a write error has occurred is recorded in a management area or stored in a memory, and subsequent recording is performed by avoiding the location where the write error has once occurred. In this way, the number of write errors can be reduced.

Figure 20:
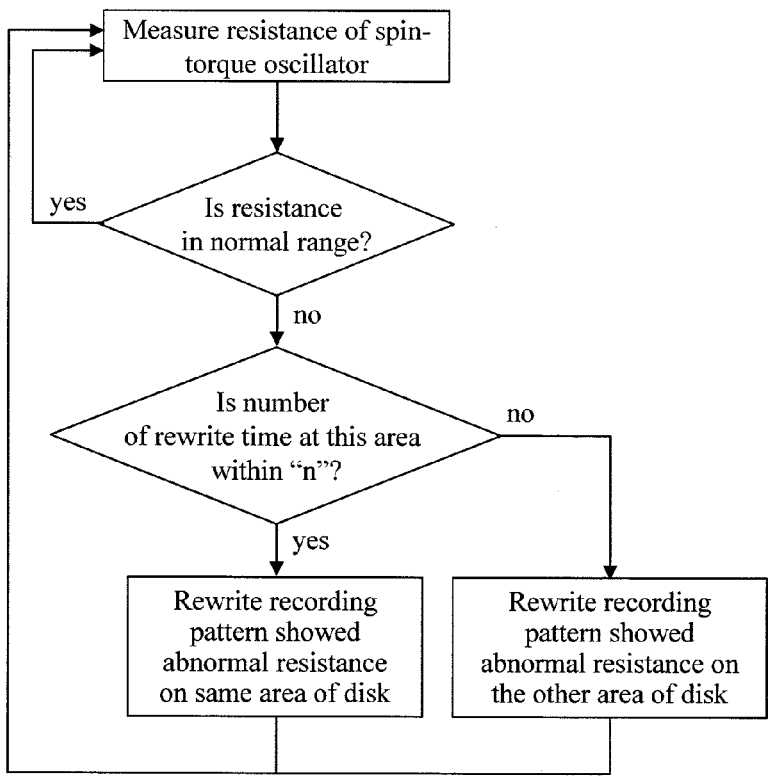
FIG. 20 is a flow chart showing an example of operation of the microwave-assisted magnetic recording system according to the present invention.

FIG. 20 is a flowchart showing another example of operation of the microwave assisted magnetic recording system according to the present invention.

If measurement of resistance of the spin torque oscillator continues during recording and it is detected that resistance of the spin torque oscillator fluctuates and moves out of the range, an operation to rewrite recording patterns in that range on a same location on the recording medium is performed. However, if fluctuation of resistance of the spin torque oscillator at a same location on the recording medium occurs for a predefined number of times, a write error is corrected by performing an operation to rewrite on a different location on the recording medium. If abnormality of a resistance value of the spin torque oscillator occurs at a same location on the recording medium for more than once, it is likely that a defect such as a dent or protrusion and the like exist on the side of the recording medium. Therefore, not only the write error is corrected but also occurrence of write errors can be efficiently prevented by not trying to record on the location where abnormality has occurred more than once. In this case, the location on the recording medium where the write error has occurred more than the predefined number of times is also recorded in the management area or stored in the memory, and subsequent recording is performed by avoiding the location where the write error has occurred.

In addition, the present invention shall not be limited to the embodiments described above and includes various examples of modifications. For example, the embodiments described above have been explained in detail so as to make the present invention easily understood, and shall not be necessarily limited to those including all configurations described above. In addition, a configuration of other embodiment can be added to configuration of one embodiment. In addition, other configuration can be added/deleted/replaced for a part of configuration of each embodiment.

The present invention can be utilized in a magnetic recording and reproducing apparatus based on the high frequency field assisted magnetic recording system.

EXPLANATION OF REFERENCE NUMERALS 1 spin torque oscillator
2 field generation layer
3 nonmagnetic intermediate layer
4 spin injection layer
5 rotating guide layer
6 trailing shield
7 main pole
8 field generation layer magnetization
9 spin injection layer magnetization
10 rotating guide layer magnetization
14 insulating region
15 lower magnetic shield
16 upper magnetic shield
17 read sensor
21 magnetic recording medium
22 magnetic disk
23 spindle motor
24 actuator
25 head slider
32 channel
33 preamplifier
50 coil

What is claimed is:

1. A magnetic recording and reproducing apparatus comprising:
    a magnetic recording medium;
    a medium driving section for driving the magnetic recording medium;
    a magnetic head including a write head for performing a recording operation on the magnetic recording medium and a read head for reading information recorded on the magnetic recording medium; and
    a head driving section for moving the magnetic head to a position above a desired track of the magnetic recording medium, wherein
    the write head includes a pole for generating a writemagnetic field and a spin torque oscillator for generating a high frequency field,
    the magnetic recording and reproducing apparatus comprises a resistance measurement section for measuring a resistance value of the spin torque oscillator during the recording operation on the magnetic recording medium by the write head, and
    when the measured resistance value moves out of a normal range, the information for which the recording operation is already performed is rewritten.

2. The magnetic recording and reproducing apparatus according to claim 1, wherein
    the resistance measurement section measures the resistance value of the spin torque oscillator during any period other than switching of the writemagnetic field.

3. The magnetic recording and reproducing apparatus according to claim 1, wherein the information for which the recording operation is already performed is rewritten to the same location on the magnetic recording medium as the location where the recording operation is already performed when the measured resistance value moves out of the normal range.

4. The magnetic recording and reproducing apparatus according to claim 1, wherein the information for which the recording operation is already performed is rewritten to a location on the magnetic recording medium different from the location where the recording operation is already performed when the measured resistance value moves out of the normal range.

5. The magnetic recording and reproducing apparatus according to claim 1, wherein
    when the measured resistance value repeatedly moves out of the normal range at a same location on the magnetic recording medium,
    up to a predefined number of times, the information for which the recording operation is already performed on the location is rewritten to the same location on the magnetic recording medium as the location where the recording operation is already performed when the resistance value moves out of the normal range, and
    if the number of rewriting operations exceeds the predefined number of times, the information for which the recording operation is already performed on the location is rewritten to a location on the magnetic recording medium different from the location where the recording operation is already performed when the resistance value moves out of the normal range.

6. The magnetic recording and reproducing apparatus according to claim 1, wherein
    during the recording operation, a fixed level of a direct-current electricity is applied to the spin torque oscillator, and the resistance measurement section measures a voltage of the spin torque oscillator to evaluate the resistance value.

7. The magnetic recording and reproducing apparatus according to claim 1, wherein
    during the recording operation, a fixed level of a direct-current voltage is applied to the spin torque oscillator, and the resistance measurement section measures a current of the spin torque oscillator to evaluate the resistance value.

8. The magnetic recording and reproducing apparatus according to claim 1, wherein
    the normal range of the resistance value of the spin torque oscillator is defined to be equivalent to a range of resistance change due to giant magnetoresistance effect or tunnel magnetoresistance effect of the spin torque oscillator.

9. The magnetic recording and reproducing apparatus according to claim 1, wherein
    the normal range of the resistance value of the spin torque oscillator is defined to be equivalent to a range of resistance change due to giant magnetoresistance effect or tunnel magnetoresistance effect of the spin torque oscillator during switching of the writemagnetic field, and is defined to be within ±10% of the resistance value in steady oscillation state of the spin torque oscillator in any period other than the switching of the writemagnetic field.

10. The magnetic recording and reproducing apparatus according to claim 1, wherein
    the normal range of the resistance value of the spin torque oscillator is not defined for a period during the switching of the writemagnetic field, but is defined to be within ±10% of the resistance value in the steady oscillation state of the spin torque oscillator in any period other than the switching of the writemagnetic field.

11. A microwave-assisted magnetic recording method for performing recording by applying a writemagnetic field from a pole and a high frequency field from a spin torque oscillator to a magnetic recording medium, the microwave-assisted magnetic recording method comprising steps of:
   performing a recording operation by applying a writemagnetic field from the pole, and applying a high frequency field from the spin torque oscillator;
   measuring a resistance value of the spin torque oscillator during the recording operation;
   judging whether or not the measured resistance value is within a predefined normal range; and
   when it is judged that the measured resistance value is out of the predefined normal range, rewriting information for which the recording operation is already performed.

12. The microwave-assisted magnetic recording method according to claim 11, wherein
   the normal range of the resistance value is defined to be equivalent to a range of resistance change due to giant magnetoresistance effect or tunnel magnetoresistance effect of the spin torque oscillator.

13. The microwave-assisted magnetic recording method according to claim 11, wherein
   the normal range of the resistance value of the spin torque oscillator is defined to be equivalent to a range of resistance change due to giant magnetoresistance effect or tunnel magnetoresistance effect of the spin torque oscillator during switching of the writemagnetic field, and is defined to be within ±10% of the resistance value in steady oscillation state of the spin torque oscillator in any period other than the switching of the writemagnetic field.

14. The microwave-assisted magnetic recording method according to claim 11, wherein
   the normal range of the resistance value of the spin torque oscillator is not defined for a period during the switching of the writemagnetic field, and defined to be within ±10% of the resistance value in the steady oscillation state of the spin torque oscillator in any period other than the switching of the writemagnetic field.

* * * * *